P. KESTNER.
APPARATUS FOR STRIPPING CARDING MACHINES BY A VACUUM.
APPLICATION FILED NOV. 10, 1913.
1,293,798.
Patented Feb. 11, 1919.
4 SHEETS—SHEET 1.
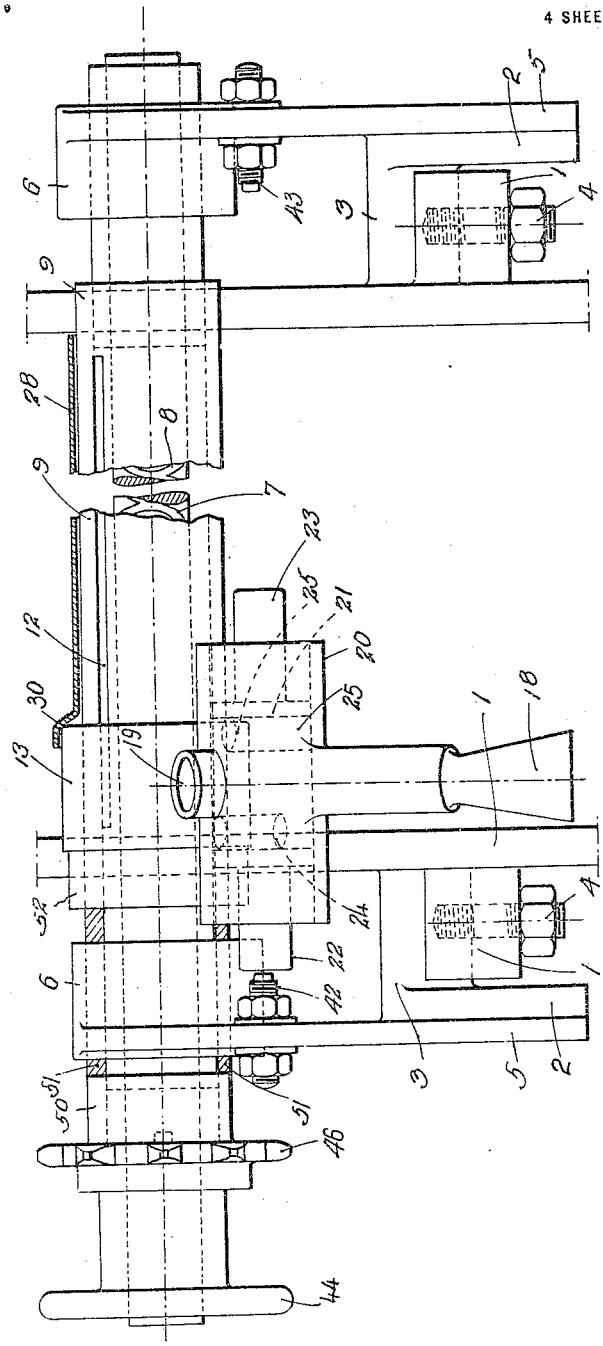

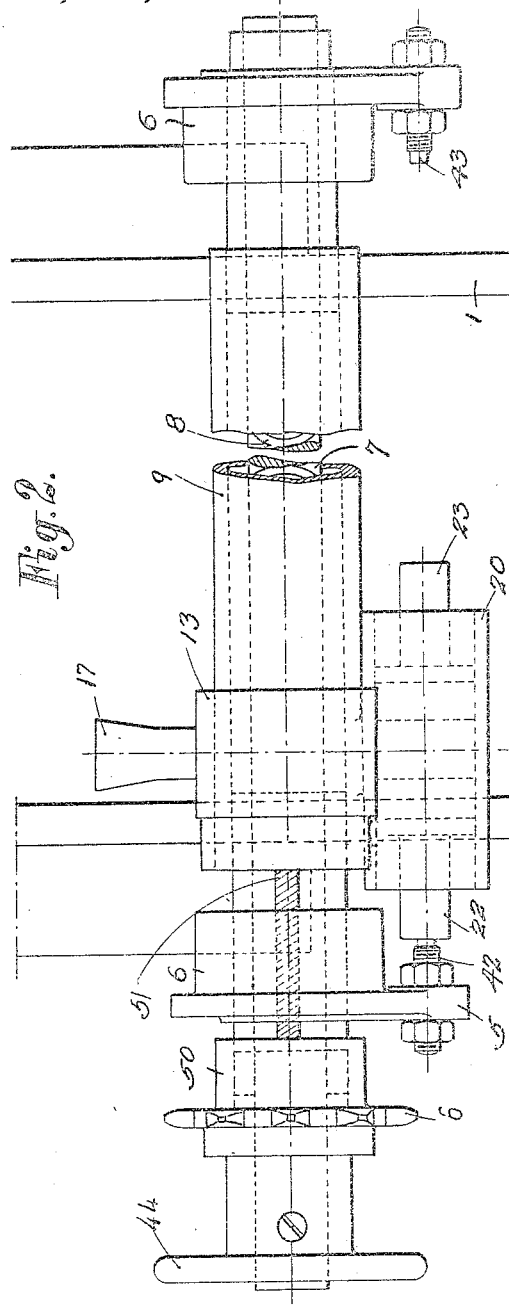
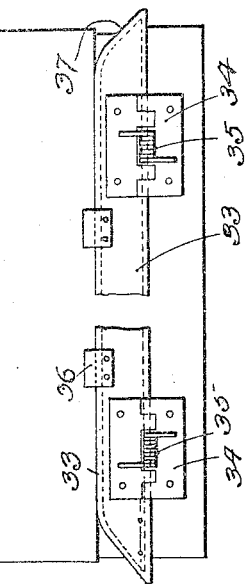
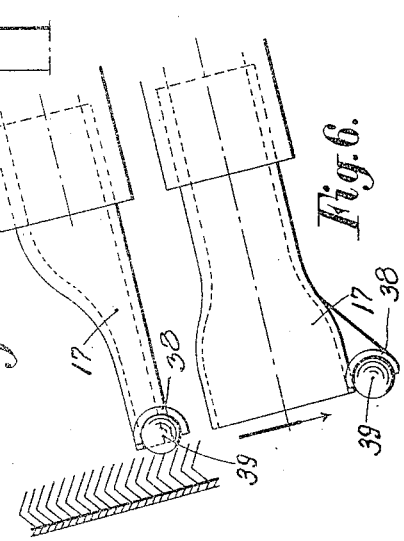

P. KESTNER.
APPARATUS FOR STRIPPING CARDING MACHINES BY A VACUUM.
APPLICATION FILED NOV. 10, 1913.
1,293,798.
Patented Feb. 11, 1919.
4 SHEETS—SHEET 3.
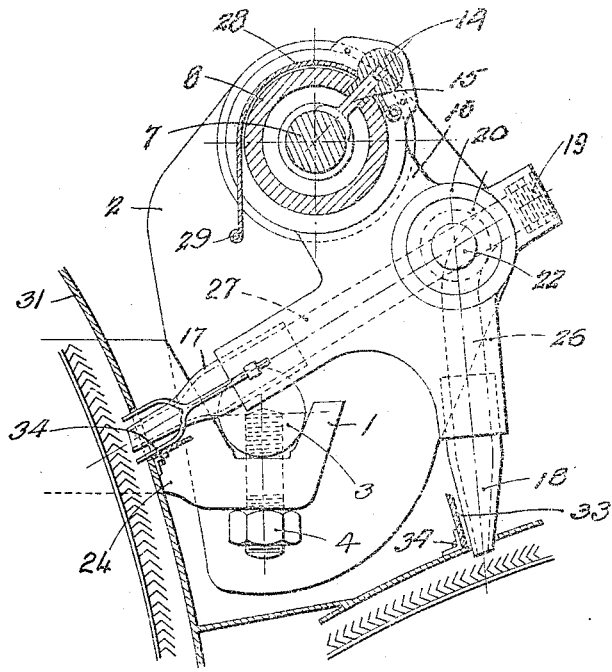
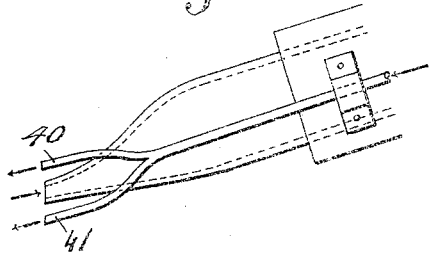
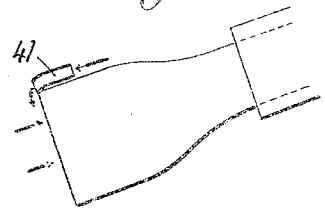

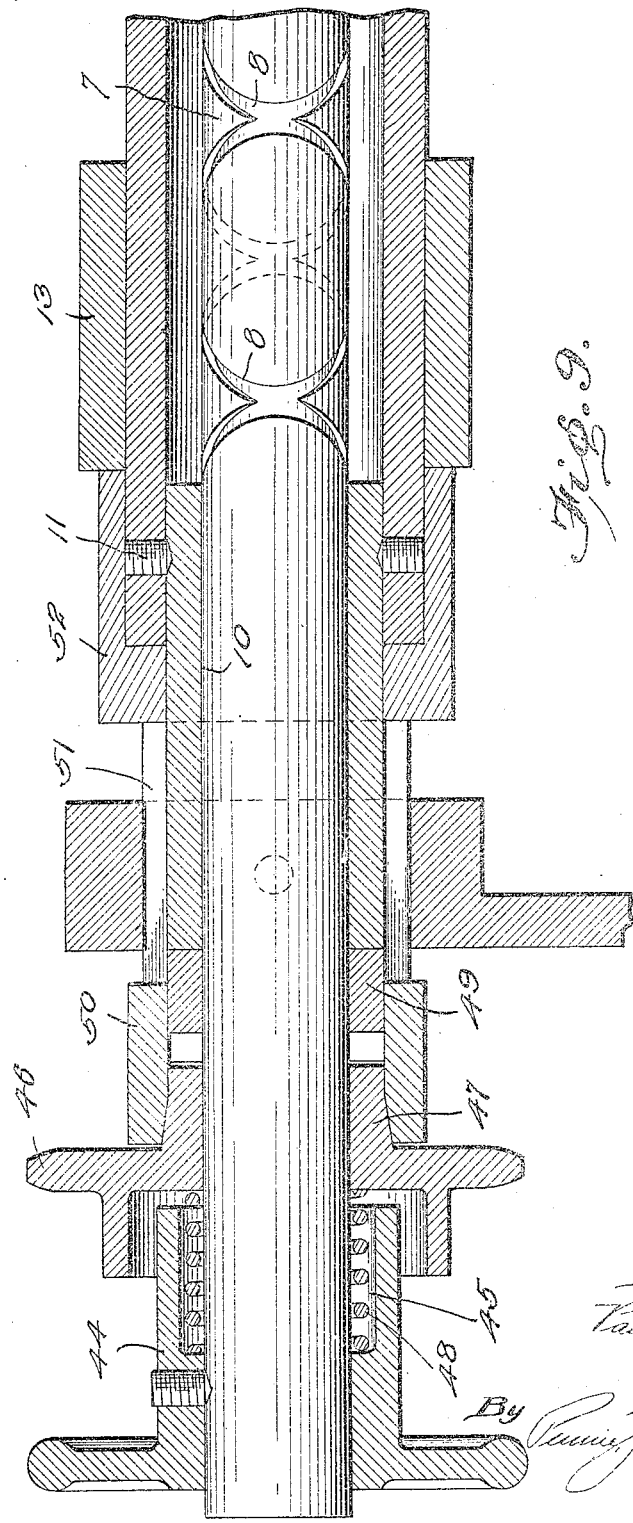

UNITED STATES PATENT OFFICE.

PAUL KESTNER, OF LILLE, FRANCE.

APPARATUS FOR STRIPPING CARDING-MACHINES BY A VACUUM.

1,293,798.  Specification of Letters Patent.  Patented Feb. 11, 1919.

Application filed November 10, 1913. Serial No. 800,134.

*To all whom it may concern:*

Be it known that I, PAUL KESTNER, citizen of the French Republic, residing at Lille, Department of the Nord, in France, have invented certain new and useful Improvements in Apparatus for Stripping Carding-Machines by a Vacuum; and I do hereby declare the following to be a full, clear, and exact description of the invention, such as will enable others skilled in the art to which it appertains to make and use the same.

This invention has for its object to provide an apparatus for stripping carding machines by means of a vacuum and for effecting the successive stripping of the drum and the doffer at a single point of the machine situated between the drum and the doffer by means of a two-part suction device mounted upon a carrier to which is imparted a reciprocatory movement.

In the embodiment of the invention a two-part suction device is illustrated, which comprises a distributer having a piston which is automatically actuated to permit either the interruption of the suction or the connecting of one or the other of the suction devices with the vacuum apparatus. The embodiment also includes means for mounting the same upon the usual brackets, which serve either for stripping or facing the carding machine. Furthermore, the apparatus is provided with convenient safety and protective arrangements and the suction device of the drum is provided with ball supports and with small back pressure orifices designed to prevent any bad cotton from being drawn from the small drum.

In the drawings:

Figure 1 is a front view of the apparatus partly broken away;

Fig. 2 is a plan view thereof;

Fig. 3 is a transverse sectional view;

Fig. 4 is a fragmental view of the safety arrangement;

Fig. 5 is a side elevation of the suction device for the large drum;

Fig. 6 is a plan view of the same;

Figs. 7 and 8 are details of a modification of the suction device; and

Fig. 9 is an enlarged vertical sectional view showing the clutch members out of engagement with each other.

Extending from the carding machine is a pair of brackets 1 which support spaced cheeks 2. These cheeks are provided with projections 3, which rest upon the brackets 1 and are attached thereto by set screws 4. A pair of relatively larger cheeks 5 are secured to the cheeks 2 and are provided with bearing portions 6. Mounted rotatably, in these bearings 6 and extending between the cheeks 5, is a shaft 7 having oppositely arranged helical grooves 8 therein. An elongated sleeve 9 surrounds the shaft 7 and is secured to a bushing 10 by suitable fasteners 11, the bushing extending into the sleeve and projecting beyond one end thereof. This bushing and sleeve are arranged so that the shaft 7 may rotate within the same and the sleeve is provided with a longitudinal slot 12 for a purpose which will later appear.

Slidably mounted on the sleeve 8 is a carriage 13, which carriage is given longitudinal movement on the sleeve by the rotation of the shaft 7. The carriage is provided with a socket member 14 in which is secured a finger 15. This finger extends inwardly through the slot 12 in the sleeve 8 and into the helical grooves in the shaft 7. It will thus be seen that as the shaft 7 is rotated, the carriage will be moved from one end to the other and inasmuch as the helical groove extends in both directions, when the carriage reaches the other end of its travel, its direction of travel will be reversed and it will again travel the length of the shaft. This carriage 13 supports a casting 16 which is provided with two nozzles 17 and 18. These nozzles communicate with a common orifice 19 which may be connected to a suitable vacuum pump. Communication between the nozzles 17 and 18 and the orifice 19 is controlled by a cut-off valve which includes a cylinder 20 in which a piston 21 operates, the piston having extensions 22 and 23 projecting from the ends of the cylinder 20. A pair of ports 24 and 25 in the piston are adapted to be moved into communication with the passageway 26, which extends from the nozzle 18, or the passageway 27, which extends from the nozzle 17, so as to establish communication between either of these nozzles and the orifice 19, or on the other hand, the piston is adapted to be moved so that neither of these ports register with the respective passageways and orifice. Thus either nozzle may be set in operation for stripping the desired drum.

In order to avoid the blocking up of the groove in the sleeve 8, which incloses the shaft 7, by the ingress of particles of dust from the cotton waste, a plate 28 is hinged at 29. One end of this plate is provided with a cam surface 30 against which the edge of the carriage 13 rides when the carriage is moving from left to right. This movement of the carriage and the coöperation with the cam causes the plate to be raised about its hinge so as to permit the travel of the finger 15 through the slot 12 in the sleeve 8.

Drum shields 31 and 32 are provided with elongated openings through which the nozzles 17 and 18 extend and in which they travel. These openings are normally closed by plates 33, which are hinged at 34 and are held in their closed position by springs 35, being supported by clamps 36, which bear against the edges of the openings. Each end of each of these plates 33 is provided with a cam 37, against which the nozzles bear in their reciprocatory movement. The bearing of these nozzles against these cams 37 opens the plates against the action of the springs 35, but as the nozzles pass the ends of the cams and the plates, the springs will cause the plates to close.

When the nozzles draw up by suction the cotton which remains in the large drum, some of the bad cotton, although no longer remaining in the cover of the large drum, is not completely drawn off by the nozzle. The small drum carries this cotton away, keeping it at the surface of its covering and returns it at the same time as the fleece which is detached by the trembler of the carding machine. The fabric of fleece thus contains this cotton which is of inferior quality.

In order to obviate this disadvantage the nozzle 17 is provided with a ball support 38 in which a ball 39 is disposed. This ball rolls close to the suction orifice of the nozzle and prevents the bad cotton from being detached. In the modified form of the device illustrated in Fig. 7, the ball 39 is omitted and in lieu thereof tubes 40 and 41 are connected, for instance to the compression side of the vacuum pump and terminate adjacent to the end of the nozzle 17, one being disposed above the nozzle and one below. The pressure of the weight upon the card is sufficient to displace in the covering the bad cotton which has been detached by the effect of the suction of the nozzle.

Fig. 8 shows another modified form of this portion of the device, which consists simply of a small tube 41, fixed on the side of the nozzle, as illustrated in the figure. The cheeks 5 carry abutments 42 and 43, which are arranged to engage the extensions 22 and 23, which project from the piston 21, so that when the carriage 13 moves from end to end of the shaft 7, the piston will be operated to cause the suction to be produced in either one nozzle or the other.

Secured to one end of the shaft 7 is a hand wheel 44 which is provided with a chamber 45, and a driving sprocket 46, by means of which motion is imparted to the shaft 7, is loosely mounted on the shaft and is provided with a clutch member 47. This clutch member is normally pressed away from the hand wheel 44 by a spring 48 which is located with the chamber 45. A second clutch member 49 is secured to the shaft 7 and is adapted to coöperate with the clutch member 47 in the driving of the shaft. A support ring 50 encircles the clutch members 47 and 49 and is adapted when moved in one direction against the tension of the spring 48 to disengage the clutch member 47 from the clutch member 49. This movement is brought about by a pair of tappets 51, which operate on the bushing 10 and slide through slots in the bearing 6 of one of the adjacent cheeks 5. The ends of these tappets opposite to the ring 50, are adapted to be engaged by a collar 52, which is in turn engaged by the carriage 13 adjacent to the end of its stroke.

Assuming that the clutch members 47 and 49 are held disengaged from each other by the tappets 51, so that the machine is at a standstill, and assuming that the drive sprocket 46 is in motion, it is only necessary to start the operation of the machine to turn the hand wheel 44. The turning of this hand wheel will cause the movement of the carriage 13 because of the engagement of the finger 15 in the helical groove in the shaft 7, so that the pressure of the tappets 51 against the ring 50 and consequently against the clutch 47, will be relieved. The spring 48 will then operate to move the clutch member 47 into engagement with the clutch member 49. This engagement will cause the rotation of the shaft 7 and consequently will cause the travel of the carriage 13 with the nozzle 17 which has been opened by the movement of the piston 21 from left to right. When the edge of the carriage 13 engages the cam surface 30 of the protector 28, the protector 28 will be lifted and the carriage will continue its stroke. Just prior to the time when the carriage 13 reaches the end of its stroke the projection 23 will engage the abutment 43, so that the port 25 will be shifted into alinement with the passageway 26 of the nozzle 18, thus establishing communication between this passageway and the port 19 and destroying communication between the passageway 27 of the nozzle 17 and this port 19. The finger 15 will, at the end of this stroke, follow the reverse groove in the helically grooved shaft 7, and cause the travel of the carriage 13 in the opposite direction. Just prior to the end of the stroke of this carriage in this direction, the projection 22 engages the abutment 42 and the piston will thus be moved so as to destroy the port between either of the passageways 26 or 27. When the carriage reaches this end of its stroke it will engage the collar 52 and through the tappets 51 and the ring 50 will exert pressure on the clutch member 47 so as to disengage the same from the clutch member 49 against the action of the spring 48. The machine will thus be stopped automatically. Referring particularly to the plates 33 which close the openings through which the ends of the nozzles 17 and 18 extend, it is pointed out that these plates will be opened as the nozzles ride over the cams 37 and will be closed when they pass beyond the plates by the springs 35.

What I claim is:

1. In a vacuum stripping apparatus for carding machines, the combination with the drum and doffer, of a suction nozzle coöperating with the drum and a second suction nozzle coöperating with the doffer, a common source of vacuum for said nozzles, a carriage movable longitudinally of the drum and carrying both of said nozzles, and means to successively place said nozzles in communication with the source of vacuum.

2. In a vacuum stripping apparatus for carding machines, the combination with the drum and doffer, of a suction nozzle coöperating with the drum and a second suction nozzle coöperating with the doffer, a common source of vacuum with which one of the nozzles is normally in communication, a carriage movable longitudinally of the drum and carrying both of said nozzles, and means automatically operable during the movement of the carriage to cut off communication between the source of vacuum and the nozzle communicating therewith and to establish communication between the source of vacuum and the other nozzle.

3. In a pneumatic stripping apparatus for carding machines, the combination with the drum and doffer and the cover-plates therefor, of a carriage movable longitudinally of the drum having suction nozzles to coöperate with the drum and doffer, the cover-plates having openings through which said nozzles project, and closures for said openings automatically opened and closed by the movement of the nozzles.

4. In a pneumatic stripping apparatus for carding machines, the combination with one of the carding elements and its cover plate, of a carriage movable longitudinally of said element and having a suction nozzle, the cover plate having an opening through which said nozzle projects, and a closure for said opening automatically opened and closed by the movement of the nozzle.

5. Stripping mechanism for carding machines, comprising a support, a carriage movable longitudinally of the support and having stripping means associated therewith, a hinged cover plate to protect said support, and means whereby the movement of the carriage automatically swings said cover plate around its hinged connection to permit movement of said carriage.

6. The combination with a carding machine, of stripping mechanism comprising a carriage mounted for movements transversely of the machine, means to move said carriage transversely of the machine, and means to automatically arrest the motion of the carriage after it has moved transversely of the machine in both directions.

7. In a pneumatic stripping mechanism for carding machines, the combination with a carding drum and doffer, of a suction nozzle for effecting the stripping of the drum, and means associated with said nozzle for preventing the bad cotton detached by the suction and not carried away by the nozzle from being discharged by the doffer.

In testimony whereof I affix my signature, in presence of two witnesses.

PAUL KESTNER.

Witnesses:
F. HÉIM,
ALFRED C. HARRISON.

Copies of this patent may be obtained for five cents each, by addressing the "Commissioner of Patents, Washington, D. C."